Jan. 15, 1963  D. S. GIRLING ET AL  3,073,943
MANUFACTURE OF ELECTRICAL CAPACITORS
Filed May 6, 1955
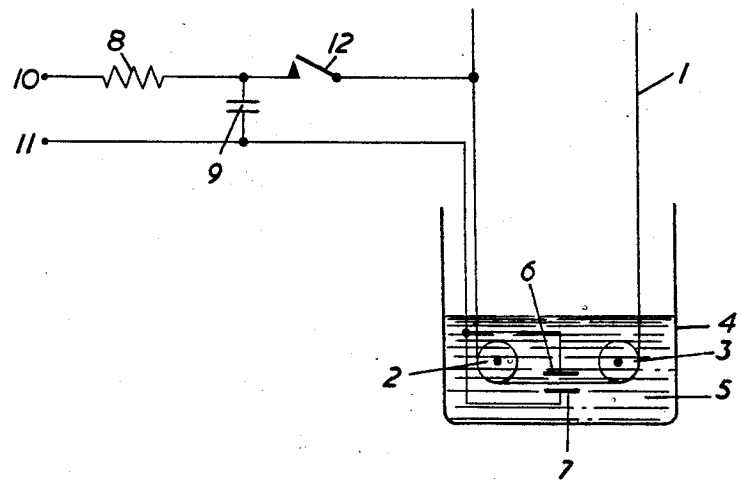
Inventors
D. S. GIRLING-
C. J. GILBERT,
By /R.P.Morris/
Attorney United States Patent Office 3,073,943
Patented Jan. 15, 1963

3,073,943
MANUFACTURE OF ELECTRICAL CAPACITORS
Douglas Stacey Girling and Clifford John Gilbert, London, England, assignors to International Standard Electric Corporation, New York, N.Y.
Filed May 6, 1955, Ser. No. 506,626
Claims priority, application Great Britain May 11, 1954
1 Claim. (Cl. 219—50)

This invention relates to the manufacture of electrical capacitors.

It is well known in the manufacture of electrodes for capacitors to coat the electrodes with an insulating material and then remove either electrolytically or by chemical etching, any portions of the electrodes not coated. This reduces the likelihood of breakdown between electrodes through pin holes in the insulating coating. It has however been found that in addition to uncoated areas there are weak spots in the coating which are liable to break down during the life of a capacitor and the present invention provides a method in which the likelihood of breakdown from this latter cause is reduced.

The method comprises the creation, during manufacture, of a voltage stress across the insulating material in order to break down the insulation in any weak spots and thus expose the metal electrodes. The coated foil may then be passed through a bath in order to remove, by chemical and/or electrolytic action, the portions exposed by the breakdowns or by pin holes in the coating.

It is advantageous to pass the coated foil through an electrolyte in order to apply the stress, although this is not essential. High voltages of the order of several hundreds of volts are required to cause the breakdowns, and applicants have found that if a continuous voltage is used the heavy current concentrations, which are caused to flow continuously through the very small areas exposed by pin holes, cause the formation of gases in the electrolyte with subsequent damage to the coating, and also cause particles of the electrode to be removed. There is danger of such particles becoming embedded in the insulating coating.

In a preferred embodiment of the invention therefore the voltage is applied as a pulse of large amplitude but short duration across the insulating material. It is therefore possible for a current of several thousands of amperes to pass momentarily, without causing overheating of the bath, or excessive gas formation, or any disruptive effects to the metal.

After the thinly coated parts have been punctured the exposed portions of the electrode are removed in the normal process which may be by chemical etching, electrolytically at a lower voltage, or by a combination of the two methods.

The invention will now be described with reference to the drawing, which shows a foil electrode 1, coated on both sides with dielectric material, passing around rollers 2 and 3 in a bath 4 containing electrolyte 5. On opposite sides of the foil are placed electrodes 6 and 7. A charging circuit comprising a resistor 8 and a capacitor 9 is connected on one side at points 10 and 11 to a D.C. supply voltage. The capacitor 9 is connected via a switch 12 to the electrode 1 and to the electrodes 6 and 7. When the switch is closed the potential on the capacitor 9 is applied between electrode 1 and electrodes 6 and 7 and a stress is set up in the insulating coating on electrode 1 sufficient to break down the coating where it is weak and to cause the capacitor to discharge.

The charged capacitor must be applied to the electrodes at least once during the passage of any one part of electrode 1 between electrodes 6 and 7.

The source of the pulse may of course be obtained by any other known means such as the use of inductive surges or by means of thyratron circuits for example.

The electrodes 6 and 7 may be replaced by conducting rollers which are in contact with the surface of the insulating coating. These rollers may form part of an assembly which guides the coated foil through an electrolytic path. There is the disadvantage however when rollers of a material which is a good conductor are used in this way that, a breakdown at one point in the coating causes the potential of the whole width of the roller to drop very rapidly, so that maximum stress is not applied to the remainder of the coating. This difficulty is overcome by making the rollers of a material which, although a conductor, has a sufficient resistance to prevent the potential on it from discharging so rapidly that the whole width of the coating is not stressed sufficiently.

While the principles of the invention have been described in connection with specific embodiments, and particular modifications thereof, it is to be clearly understood that this description is made only by way of example and not as a limitation on the scope of the invention.

What we claim is:

A method of manufacturing an electrical capacitor having an electric conductor coated with a thin layer of insulating material comprising the step of applying a high voltage, for a period of short duration, across the thickness of the insulation, before the coated conductor is wound into the capacitor, the voltage being sufficiently high to break down and destroy any weak areas in the insulating coating, said electric conductor being in the form of a ribbon and being coated with insulation on both sides thereof, and said voltage being applied between the conductor and two electrodes situated on opposite sides of said conductor.

References Cited in the file of this patent

UNITED STATES PATENTS

| | | |
|---|---|---|
| 464,125 | Varley | Dec. 1, 1891 |
| 695,127 | Thomson et al. | Mar. 11, 1902 |
| 920,970 | Mansbridge | May 11, 1909 |
| 1,641,322 | Czapek et al. | Sept. 6, 1927 |
| 1,808,520 | Brobst | June 2, 1931 |
| 1,909,079 | Steerup | May 16, 1933 |
| 2,092,489 | Williams | Sept. 7, 1937 |
| 2,424,904 | Ruben | July 29, 1947 |
| 2,522,151 | Weeks | Sept. 12, 1950 |
| 2,555,321 | Dalton et al. | June 5, 1951 |
| 2,597,511 | Mellen et al. | May 20, 1952 |
| 2,794,168 | Gooding | May 28, 1957 |